United States Patent [19]
Holland

[11] 3,894,033
[45] July 8, 1975

[54] 5-ARYLTETRAZOLES

[75] Inventor: Gerald F. Holland, Old Lyme, Conn.

[73] Assignee: Pfizer Inc., New York, N.Y.

[22] Filed: May 16, 1974

[21] Appl. No.: 470,512

[52] U.S. Cl. ..... 260/293.69; 260/239.8; 260/239.9; 260/247.1 M; 260/308 D; 260/465 F; 260/465 G; 424/229; 424/248; 424/267; 424/269
[51] Int. Cl. ............................................ C07d 29/34
[58] Field of Search... 260/247.1 M, 293.69, 308 D, 260/239.9

[56] References Cited
UNITED STATES PATENTS
3,665,002  5/1972  Popelak et al. ............. 260/239.9

Primary Examiner—Henry R. Jiles
Assistant Examiner—S. D. Winters
Attorney, Agent, or Firm—Connolly and Hutz

[57] ABSTRACT

5-Substituted phenyltetrazoles and their pharmaceutically acceptable basic salts as hypolipemic agents in mammals.

12 Claims, No Drawings

5-ARYLTETRAZOLES

BACKGROUND OF THE INVENTION

1. Field of the Invention

This invention is concerned with agents useful in the treatment of atherosclerosis, a form of arteriosclerosis, which is characterized by accumulation of lipids in the aorta and in the coronary, cerebral and peripheral arteries of the lower extremeties. As these masses increase in size, the risk of thrombosis and occlusion arises.

It has been found that those suffering from the disease exhibit elevated levels of plasma lipoprotein, of which cholesterol and triglycerides comprise major constituents. While the etiology of the disease is not yet fully understood, it is believed that β-lipoproteins play an important role, and it has been recommended that dietary habits which promote low β-lipoprotein plasma levels be observed. In addition, various therapeutic agents such as estrogens, thyroxine analogs, p-chlorophenoxyisobutyric acid (Atromid-S) and sitosterol preparations have been used to lower plasma cholesterol levels in individuals prone to the condition.

This invention relates to a series of 5-(2-halo-5-sulfamoylphenyl)tetrazoles, 5-(2-benzylthio-5-chlorophenyl)tetrazoles and 5-(2-benzylthio-5-trifluoromethylphenyl)tetrazoles and the pharmaceutically acceptable basic salts thereof as hypolipemic agents.

2. Description of the Art

The biological and non-biological uses of tetrazoles has recently been reviewed by Benson, "Heterocyclic Compounds," Elderfield, Ed., Vol. 8, John Wiley & Sons, Inc., New York, N.Y., 1967, Chapter 1. In addition the use of heterocyclic tetrazoles as hypolipemic agents has been shown in U.S. Pat. Nos. 3,378,564, 3,435,115 and 3,448,107.

Buchanan, et al., *J. Med. Chem.*, 12, 1001 (1969) teaches the anti-hypercholesteremic effect of certain phenoxy- and thiophenoxymethyltetrazoles.

SUMMARY OF THE INVENTION

It has now been found that compounds of the formulae

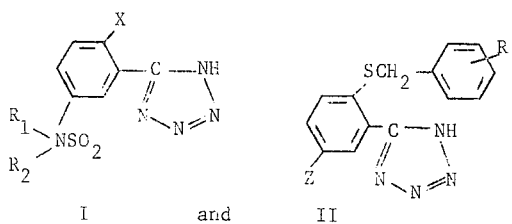

I and II and the pharmaceutically acceptable basic salts thereof, wherein X is methyl, chlor, fluoro or bromo; $R_1$ is hydrogen or alkyl containing from 1 to 4 carbon atoms, $R_2$ is alkyl containing from 1 to 4 carbon atoms or

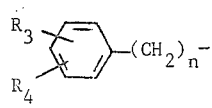

where $n$ is an integer of 0 to 3 and $R_3$ and $R_4$ are each hydrogen, methyl, chloro or bromo; $R_1$ and $R_2$ when taken together with the nitrogen to which they are attached form a morpholine, hexamethyleneimine, piperidine, monomethyl- or dimethylpiperidine ring; Z is chloro or trifluoromethyl; and R is hydrogen, methyl, methoxy, fluoro, chloro, bromo or trifluoromethyl are hypolipemic agents.

The term "hypolipemic" is used here in the broad sense to include the lowering of triglycerides, cholesterol, phospholipids or free fatty acid levels. Plasma lipids are carried in the body in the form of lipoproteins, i.e., protein complexes. These may be separated by electrophoresis into several fractions: high density or α-lipoprotein, containing a high proportion of phospholipids; very low-density or pre-β-lipoprotein; and chylomicrons; the latter two fractions containing a major proportion of triglycerides. In a particular individual, one of the four fractions may be elevated. The agents of the present invention depress plasma lipoprotein, with associated cholesterol and triglyceride, and hence are of value in hyperlipoproteninemic individuals.

Also considered within the scope of the present invention are 5-phenyltetrazoles of the formula

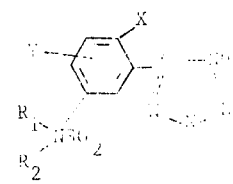

wherein, in addition to the definition previously indicated, X is amino and mono- and disubstituted amino and $R_1$ and $R_2$ taken together represent a piperidine mono- or disubstituted by chlorine, hydroxy, methoxy, benzyloxy, hydroxymethyl or chloromethyl.

The preferred compounds of the present invention are those of formula I wherein X is chloro and $R_1$ is hydrogen or alkyl having from 1 to 4 carbon atoms, and those wherein X is chloro and $R_1$ and $R_2$ together with the nitrogen atom to which they are attached form a dimethylpiperidine ring.

A second class of preferred compounds are those of formula II wherein R is hydrogen or chloro.

DETAILED DESCRIPTION OF THE INVENTION

In accordance with the process for synthesizing the compounds of the instant invention the following scheme is illustrative for those of formula I:

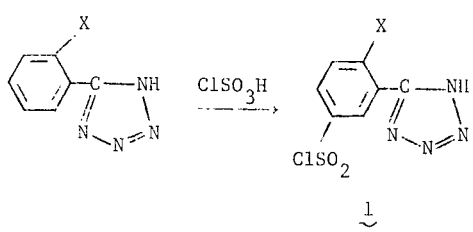

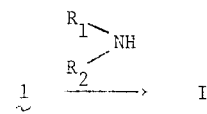

For the preparation of those compounds of formula II the following synthetic scheme is employed:

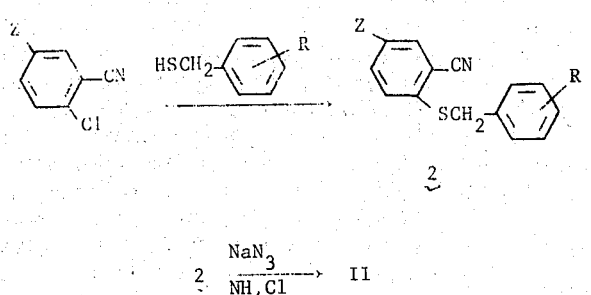

In practice, the intermediate compounds 1 are prepared by chlorosulfonation of the appropriate 5-(2-halophenyl)tetrazole using chlorosulfonic acid either neat or in a suitable solvent such as a chlorinated hydrocarbon. When caried out neat, ie., no solvent being employed, it is preferred that an excess of chlorosulfonic acid be employed as reactant and solvent for said reaction.

Isolation of the resulting sulfonic acid chloride is achieved by carefully quenching the reaction mixture in ice and water. The sulfonyl chloride 1 is either filtered or extracted with a water immiscible solvent such as benzene, ethyl acetate or methylene chloride.

Amination of the sulfonyl chloride 1 with a requisite amine is carried out in an aprotic, water miscible solvent such as acetone. Aqueous sodium hydroxide is added to facilitate completion of the reaction by acting as a scavenger for the hydrogen chloride resulting from the reaction of the sulfonyl chloride with the amine. In addition, the added base converts the acidic tetrazole to a basic salt.

Following completion of the reaction, the product I, which remains in solution by virtue of the water solubility of its salt, is precipitated by adjustment of the pH to 3-4 using a mineral acid such as hydrochloric acid. The solids are filtered and subsequently recrystallized from an appropriate solvent.

The starting 5-(2-halophenyl)tetrazoles are prepared according to the procedure of Herbst, et al., *J. Org. Chem.*, 22, 1142 (1957) from the corresponding commercially-available 2-halobenzonitriles. The amines employed in the reaction with the sulfonyl chlorides are either commercial materials or are easily synthesized by methods familar to those skilled in the art.

The intermediates 2 leading to compounds II of the present invention are prepared by reacting the commercially-available 2-chloro-5-trifluoromethyl or 5-chlorobenzonitrile with an equimolar amount of the sodium salt of an appropriate benzyl mercaptan in a polar, aprotic solvent such as dimethylformamide, hexamethylphosphoramide or dimethylacetamide. Isolation of the intermediate 2-benzylthio-5-trifluoromethyl or 5-chlorobenzonitrile is carried out by quenching the reaction mixture in ice water, followed by filtration of the precipitated solids, or by extraction with a water immiscible solvent such as diethyl ether or methylene chloride.

The sodium mercaptide employed in the above-described reaction is prepared from the mercaptan and sodium methoxide in methanol. The solid salt is isolated by removal of the solvent under reduced pressure. The benzyl mercaptan is synthesized by the method as taught by Kipnis, et al., *J. Am. Chem. Soc.*, 71, 2270 (1949).

Treatment of the intermediate 2 with a slight molar excess of sodium azide and ammonium chloride in dimethylformamide according to the method of Finnegan, et al., *J. Am. Chem. Soc.*, 80, 3908 (1958) is the preferred method for the conversion of 2 to II. In addition, several other sources of azide can be employed, such as lithium azide, tetramethylammonium azide, ammonium azide, aluminum azide, morpholinium azide, piperidinium azide or hydrazoic acid.

Following completion of the reaction, the mix is filtered, the filtrate diluted with water and acidified to precipitate the acidic tetrazole.

As has been previously noted, a characteristic feature of the acidic tetrazole compounds of the instant invention is their ability to form basic salts. Tetrazole congeners of the present invention are converted to basic salts by the interaction of said tetrazole with an appropriate base in an aqueous or non-aqueous medium. Such basic reagents suitably employed in the preparation of said salts can vary in nature, and are meant to contemplate such bases as organic amines, ammonia, alkali metal hydroxides, carbonates, bicarbonates, hydrides and alkoxides, as well as alkali earth metal hydroxides, hydrides, alkoxides and carbonates. Representative of such bases are ammonia, primary amines such as n-propylamine, n-butylamine, aniline, cyclohexylamine, benzylamine, p-toluidine, ethylamine, octylamine, tertiary amines such as diethylaniline, N-methylpyrrolidine, N-methylmorpholine and 1,5-diazabicyclo-[4,3,0]-5-nonene; sodium hydroxide, potassium hydroxide, ammonium hydroxide, sodium ethoxide, potassium methoxide, magnesium hydroxide, calcium hydride and barium hydroxide.

In the utilization of the chemotherapeutic activity of those compounds of the present invention which form basic salts, it is preferred, of course, to use pharmaceutically acceptable salts. Although water-insolubility, high toxicity, or lack of crystalline nature may make some salt species unsuitable or less desirable for use as such in a given pharmaceutical application, the water insoluble or toxic salts can be converted to the corresponding acids by decomposition of the salts as described above, or alternately they can be converted to any desired pharmaceutically acceptable basic salt. The said pharmaceutically acceptable salts preferred are those wherein the cation is ammonium, sodium or potassium.

Outstanding for their effectiveness as hypolipemic agents in mammals are the following 5-(2-halo-5-sulfamoylphenyl)tetrazoles of formula I: 5-(2-chloro-5-[2-p-chlorophenethylsulfamoyl]phenyl)tetrazole; 5-(2-chloro-5-[N-ethyl-N-2-p-chlorophenethylsulfamoyl]-phenyl)tetrazole; 5-(2-chloro-5-di-n-butylsulfamoyl-phenyl)tetrazole; and 5-(2-chloro-5-[3,5-cis-dimethylpiperidinosulfonyl]phenyl)tetrazole.

The preferred hypolipemic compounds of formula II include 5-(2-benzylthio-5-trifluoromethylphenyl)tetrazole and 5-(2-p-chlorobenzylthio-5-trifluoromethylphenyl)tetrazole.

Although parenteral modes of administration of the compounds of the present invention may be employed, oral administration is effective and preferred for its obvious convenience. The products of the invention are tested in vivo for hypolipemic activity in rats. Groups, each comprising 4 animals, of normal Spraque-Dawley (Charles River) male rats weighing from 160 to 220 grams are fed rat chow containing the compound under test for two overnight feeding periods. On the morning of the third day the animals are anesthetized and bled from the abdominal aorta. The total plasma cholesterol is then determined by the method of J. J. Carr and I. J. Drekter, reported in *Clin. Chem.*, 2, 353 (1956). Most of the tests are conducted at a feed concentration of 0.15 to 0.25 weight percent of the compound under test, but lower levels, 0.01 to 0.10 weight percent, are employed in some instances where particularly high potency is anticipated. The plasma cholesterol level of the treated animals is found to be significantly reduced when compared to animals not receiving the test compound.

This pharmacological test for measuring hypocholesteremic activity is a reasonably reliable indication that similar activity in humans can be expected. In fact, those compounds effective in the rat which have been tested in humans have demonstrated similar activity. p-Chlorophenoxyisobutyric acid, ethyl ester, marketed as Atromid-S, a well-known and clinically effective hypocholesteremic agent, causes a 30–35% cholesterol fall in the rate test when administered at a level of 0.25% in the feed.

Obviously, the optimum dosage level for a particular compound of the present invention will vary with the relative potency of the substance and with the age, weight and response of the particular patient. An approximation of suitable dosage levels for various compounds can be estimated from their potency in the rat test relative to a standard which has been tested in humans, such as Atromid-S. In determining relative potency, dose response curves are preferably constructed by rat testing at several dosage levels, for example, at seven levels. A compound which proves twice as potent as the standard in this test will generally be evaluated in toxicology as a candidate for use at half the level employed with the standard.

Having full regard for the foregoing factors, it is considered that an effective daily dosage of the compounds of the present invention in humans will generally range from about 0.5 to 5 grams per day, in single or divided dosage, or at about 7 to 70 mg. per kg. of body weight. These values are illustrative, and there may, of course, be individual cases where higher or lower dosage ranges are merited.

The tetrazoles of this invention can be administered either alone, or preferably, in combination with a pharmaceutically-acceptable carrier. They may be combined with various pharmaceutically-acceptable, inert carriers in the form of tablets, capsules, lozenges, troches, powders, aqueous suspensions or solutions, elixirs, syrups and the like. Suitable carriers include solid diluents or aqueous media and non-toxic organic solvents. The oral pharmaceutical compositions of this invention may be suitably sweetened and flavored by means of various agents commonly employed for such a purpose.

For parenteral administration, solutions or suspensions of the herein described tetrazoles in sesame or peanut oil or in aqueous propylene glycol solutions can be employed, as well as sterile aqueous solutions of the corresponding water-soluble salts. Such solutions are suitable for intramuscular and subcutaneous administration. Sterile aqueous solutions are additionally useful for intravenous injection, provided that their pH is suitably adjusted and buffered, if necessary, and the liquid diluent rendered isotonic with saline or glucose.

The herein disclosed compounds may also be useful in other aspects of abnormal metabolism, the latter possibly accounting for clinical problems in diabetes, pancreatitis, coronary heart disease, and cerebrovascular disease. Hence the ability of the tetrazoles of this invention to regulate lipid metabolism might find utility in the treatment of said disease.

The following examples are provided solely for the purpose of illustration and are not to be construed as limitations of this invention, many variations of which are possible without departing from the spirit or scope thereof.

EXAMPLE I 5-(2-Chloro-5-chlorosulfonylphenyl)tetrazole
(1:x=Cl)

To 30 ml. of chlorosulfonic acid is added portionwise 10 g. (0.055 mole) of 5-(2-chlorophenyl)tetrazole, and the resulting brown solution heated to 155° C. for 2 hrs. The reaction mixture is cooled to room temperature and added dropwise to 600 ml. of ice and water. The resulting precipitate is filtered, air dried and recrystallized from ethyl acetate-hexane, 6.6 g., m.p. 194° C. dec. A small sample is recrystallized from ethyl acetate-hexane for analysis, m.p. 200° C. dec.

Anal. Calc'd for $C_7H_4O_2N_4SCl_2$: C, 30.1; H, 1.4; N, 20.1. Found: C, 30.2; H, 1.6; N, 20.5.

In a similar manner are prepared 5-(2-fluoro-5-chlorosulfonylphenyl)tetrazole, 5-(2-bromo-5-chlorosulfonylphenyl)tetrazole and 5-(2-methyl-5-chlorosulfonylphenyl)tetrazole.

EXAMPLE 2

5-(2-Chloro-5-di-n-propylsulfamoylphenyl)tetrazole
(I:X=Cl; $R_1$, $R_2$=n—$C_3H_7$)

5-(2-Chloro-5-chlorosulfonylphenyl)tetrazole (1.29 g., 4.6 m moles) is added portionwise over a 2 min. period to a solution of 505 mg. (5.0 m moles) of di-n-propylamine in 5 ml. of acetone and 15 ml. of 1N sodium hydroxide solution with stirring. The resulting yellow solution is allowed to stir at room temperature for one hour, and is then diluted with 100 ml. of water. The quenched reaction mixture is acidified with 12N hydrochloric acid and the resulting precipitate filtered and dried. Recrystallization from ethyl acetate gave 677 mg. of the product, m.p. 178–180° C.

Anal. Calc'd for $C_{13}H_{14}O_2N_5SCl$: C, 45.4; H, 5.3; N, 20.4. Found: C, 45.3; H, 5.4; N, 20.5.

EXAMPLE 3

Starting with the appropriate 5-(2-halo-5-chlorosulfonylphenyl)-tetrazole and requisite amine, and repeating the procedure of Example 2, the following congeners are prepared:

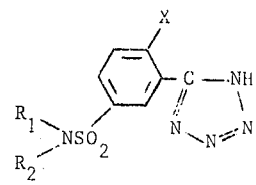

| $R_1$ | $R_2$ | X |
|---|---|---|
| H— | $CH_3$— | Cl |
| H— | i—$C_3H_7$— | Cl |
| H— | t—$C_4H_9$— | Cl |
| $CH_3$— | $C_2H_5$— | Cl |
| i—$C_3H_7$— | i—$C_3H_7$— | Cl |
| H— | $C_2H_5$— | F |
| H— | n—$C_3H_7$— | F |
| $CH_3$— | $CH_3$— | F |
| $C_2H_5$— | $C_2H_5$— | F |
| n—$C_3H_7$— | $C_2H_5$— | F |
| n—$C_4H_9$— | n—$C_4H_9$— | F |
| H— | n—$C_4H_9$— | Br |
| H— | t—$C_4H_9$— | Br |
| $CH_3$— | $CH_3$— | Br |
| $C_2H_5$— | n—$C_3H_7$— | Br |
| t—$C_4H_9$— | t—$C_4H_9$— | Br |
| H— | $CH_3$— | $CH_3$ |
| H— | s—$C_4H_9$— | $CH_3$ |
| H— | n—$C_3H_7$— | $CH_3$ |
| n—$C_3H_7$— | n—$C_3H_7$— | $CH_3$ |
| n—$C_4H_9$— | n—$C_4H_9$— | $CH_3$ |
| s—$C_4H_9$— | s—$C_4H_9$— | $CH_3$ |

EXAMPLE 4

5-(2-Chloro-5-morpholinosulfonylphenyl)tetrazole
(I:X=Cl; $R_1$, $R_2$=—$(CH_2)_2O(CH_2)_2$—).

To a solution of 435 mg. (5 m moles) of morpholine in 5 ml. of acetone and 15 ml. of 1N sodium hydroxide is added over a 2 min. period 1.29 g. (4.6 m moles) of 5-(2-chloro-5-chlorosulfonylphenyl)tetrazole. After stirring at room temperature for one hour, the reaction mixture is diluted with water, and the pH adjusted to 3 with 12N hydrochloric acid. The crude product is filtered, washed with water and dried, 1.19 g., m.p. 193–196° C. The product is purified further by recrystallization from ethyl acetate-methanol, 916 mg., m.p. 196°–198° C.

Anal. Calc'd for $C_{11}H_{12}O_3N_5SCl$: C, 40.1; H, 3.7; N, 21.2. Found: C, 40.2; H, 3.8; N, 21.2.

EXAMPLE 5

5-(2-Chloro-5-[3,5-cis-dimethylpiperidinosulfonyl]-phenyl)tetrazole

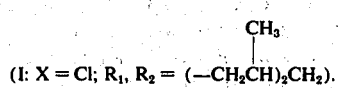

(I: X = Cl; $R_1$, $R_2$ = (—$CH_2CH)_2CH_2$).

Starting with 450 mg. (3 m moles) of 3,5-cis-dimethylpiperidine hydrochloride, 5 ml. of acetone, 9 ml. of 1N sodium hydroxide solution and 700 mg. (2.5 m moles) of 5-(2-chloro-5-chlorosulfonylphenyl)tetrazole and following the procedure of Example 4, there is obtained 630 mg. of product, m.p. 229°–231° C.

Anal. Calc'd for $C_{14}H_{18}O_2N_5SCl$: C, 47.3; H, 5.1; N, 19.7. Found: C, 47.2; H, 5.2; N, 19.9.

EXAMPLE 6

Employing the procedure of Example 4 or 5 and starting with the appropriate reagents, the following analogs are synthesized:

5-(2-chloro-5-piperidinosulfonylphenyl)tetrazole;
5-(2-chloro-5-hexamethyleneiminosulfonylphenyl)tetrazole;
5-(2-chloro-5-[4,4-dimethylpiperidinosulfonyl]-phenyl)tetrazole;
5-(2-chloro-5-[2-methylpiperidinosulfonyl]phenyl)tetrazole;
5-(2-chloro-5-[4-methylpiperidinosulfonyl]phenyl)tetrazole;
5-(2-fluoro-5-[3,4-cis-dimethylpiperidinosulfonyl]-phenyl)tetrazole;
5-(2-fluoro-5-[-dimethylpiperidinosulfonyl]phenyl)tetrazole;
5-(2-fluoro-5-[3,5-cis-dimethylpiperidinosulfonyl]-phenyl)tetrazole;
5-(2-fluoro-5-hexamethyleneiminosulfonylphenyl)tetrazole;
5-(2-bromo-5-piperidinosulfonylphenyl)tetrazole;
5-(2-bromo-5-morpholinosulfonylphenyl)tetrazole;
5-(2-bromo-5-[4,4-dimethylpiperidinosulfonyl]-phenyl)tetrazole;
5-(2-methyl-5-piperidinosulfonylphenyl)tetrazole;
5-(2-methyl-5-[3,5-cis-dimethylpiperidinosulfonyl]-phenyl)tetrazole;
5-(2-methyl-5-morpholinosulfonylphenyl)tetrazole;
5-(2-methyl-5-hexamethyleneiminosulfonylphenyl)tetrazole;
5-(2-fluoro-5-[2-methylpiperidinosulfonyl]phenyl)tetrazole;
5-(2-bromo-5-[4-methylpiperidinosulfonyl]phenyl)tetrazole;
5-(2-methyl-5-[3-methylpiperidinosulfonyl]phenyl)-tetrazole and
5-(2-methyl-5-[4,4-dimethylpiperidinosulfonyl]-phenyl)tetrazole.

EXAMPLE 7

5-(2-Chloro-5-[2-p-chlorophenthylsulfamoyl]phenyl)-tetrazole (I:X=Cl; $R_1$=H, $R_2$=p—$ClC_6H_4CH_2CH_2$—)

A solution of 775 mg. (5 m moles) of 2-p-chlorophenethylamine, 15 ml. of acetone, 15 ml. of 1N sodium hydroxide and 1.29 g. (4.6 m moles) of 5-(2-chloro-5-chlorosulfonylphenyl)tetrazole is allowed to stir at room temperature for one hour. The solution is diluted with 100 ml. of water and acidified with 12N hydrochloric acid. The product is filtered, washed with water and dried, 505 mg., m.p. 176°–178° C.

Anal. Calc'd for $C_{15}H_{13}O_2N_5SCl_2$: C, 45.2; H, 3.3; N, 17.6. Found: C, 45.3; H, 3.4; N, 17.3.

EXAMPLE 8

5-(2-Chloro-5-[N-ethyl-N-2-p-Chlorophenethylsulfamoyl]phenyl)tetrazole (I:X=Cl; $R_1$=$C_2H_5$; $R_2$=p—$ClC_6H_4CH_2CH_2$—).

In a manner similar to the procedure of Example 7, 1.83 g. (10 m moles) of N-ethyl-N-2-p-chlorophenethylamine and 2.6 g. (9.3 m moles) of 5-(2-chloro-5-chlorosulfonylphenyl)tetrazole in 30 ml. of acetone and 30 ml. of 1N sodium hydroxide solution provided on work-up after a reaction of 1.5 hrs., 670 mg. of the desired product, m.p. 172–176° C. The analytical sample is recrystallized from ethyl acetate, m.p. 179°–181° C.

Anal. Calc'd for $C_{17}H_{17}O_2N_5SCl_2$: C, 47.9; H, 4.0; N, 16.4. Found: C, 47.7; H, 3.9; N; 16.5.

EXAMPLE 9

The procedure of Example 7 is again repeated, starting with the requisite 5-(2-halo-5-chlorosulfonylphenyl)tetrazole and amine, to provide the following products:

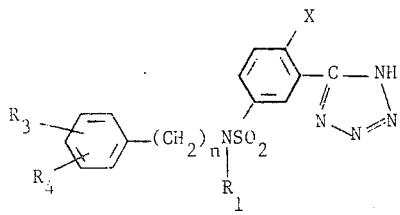

| X | $R_1$ | $R_3$ | $R_4$ | n |
|---|---|---|---|---|
| Cl— | H— | 3—Cl— | 4—Br— | 0 |
| Cl— | $CH_3$— | 3—$CH_3$— | 4—Br— | 0 |
| Cl— | H— | H— | H— | 1 |
| Cl— | $CH_3$— | 2—$CH_3$— | 4—$CH_3$— | 1 |
| Cl— | $C_2H_5$— | H— | 4—Cl— | 2 |
| Cl— | $CH_3$— | H— | 3—Cl— | 3 |
| F— | n—$C_3H_7$— | H— | 4—$CH_3$— | 0 |
| F— | n—$C_3H_7$— | 2—Cl— | 4—Cl— | 0 |
| F— | $C_2H_5$— | H— | H— | 1 |
| F— | $C_2H_5$— | H— | 4—Cl— | 2 |
| F— | t—$C_4H_9$— | H— | H— | 3 |
| F— | $CH_3$— | 2—$CH_3$— | 4—Cl— | 3 |
| Br— | H— | 3—Cl— | 4—Br— | 0 |
| Br— | $CH_3$— | 3—$CH_3$— | 4—Br— | 0 |
| Br— | $C_2H_5$— | H— | H— | 1 |
| Br— | i—$C_3H_7$— | H— | 4—Cl— | 1 |
| Br— | $C_2H_5$— | H— | 4—Cl— | 2 |
| Br— | H— | H— | H— | 3 |
| Br— | $CH_3$— | 2—$CH_3$— | 4—Cl— | 3 |
| $CH_3$— | n—$C_4H_9$— | 3—Cl— | 4—Cl— | 0 |
| $CH_3$— | n—$C_3H_7$— | H— | 4—$CH_3$— | 0 |
| $CH_3$— | i—$C_3H_7$— | H— | 4—Cl— | 1 |
| $CH_3$— | n—$C_3H_7$— | 3—Cl— | 4—Cl— | 2 |
| $CH_3$— | H— | H— | H— | 3 |
| $CH_3$— | s—$C_4H_9$— | 3—Br— | 4—Cl— | 3 |
| $CH_3$— | $C_2H_5$— | H— | 4—Cl— | 2 |

EXAMPLE 10

5-(2-Benzylthio-5-trifluoromethylphenyl)tetrazole
(II:R=H; Z=$CF_3$)

A. 2-Benzylthio-5-trifluoromethylbenzonitrile (2: R=H; Z=$CF_3$)

A solution of 12.4 g. (0.1 mole) of benzyl mercaptan in 100 ml. of methanol is treated with 5.4 g. (0.1 mole) of sodium methoxide under a nitrogen atmosphere. The resulting solution is concentrated in vacuo to dryness leaving the sodium benzyl mercaptide as a white residue. The salt, dissolved in 100 ml. of dimethylformamide, is treated with 21 g. (0.1 mole) of 2-chloro-5-trifluoromethylbenzonitrile and the resulting reaction mixture allowed to stir under nitrogen for 30 min. at room temperature. The mixture is poured into 500 ml. of water and ice and the product extracted into 400 ml. of diethyl ether. The organic layer is separated, washed with water and dried over sodium sulfate. Removal of the solvent under reduced pressure gives 27.5 g. of the product, which crystallizes on standing.

B. 5-(2-Benzylthio-5-trifluoromethylphenyl)tetrazole (II:R=H; Z=$CF_3$)

A mixture of 13 g. (45 m moles) of 2-benzylthio-5-trifluoromethylbenzonitrile, 4 g. (60 m moles) of sodium azide, 3.2 g. (60 m moles) of ammonium chloride and 60 mg. of lithium chloride in 30 ml. of dimethylformamide is stirred and heated for 15 hrs. at 125° C. The mixture is cooled to room temperature, filtered and the filtrate subsequently concentrated to a small volume. The residue is dissolved in 50 ml. of ethanol and the solution made acid with 12N hydrochloric acid. The acidified solution is then diluted with 100 ml. of water. The product precipitates as a semicrystalline gum, which is filtered and washed with water. Recrystallization from acetone-benzene gives the purified product, m.p. 171.5–172.5° C.

Anal. Calc'd for $C_{15}H_{11}N_4SF_3$: C, 53.6; H, 3.3; N, 16.7. Found: C, 53.4; H, 3.7; N, 16.8.

EXAMPLE 11

Employing the procedure of Example 10A and 10B, and starting with appropriate reagents, the following tetrazoles are synthesized:

| Z | R |
|---|---|
| $CF_3$— | 4—$CH_3$— |
| Cl— | 2—$CH_3$— |
| Cl— | 2—$CH_3$— |
| $CF_3$— | 3—F— |
| $CF_3$— | 4—F— |
| Cl— | 2—Cl— |
| Cl— | 3—Cl— |
| $CF_3$— | 4—Cl— |
| Cl— | 4—Br— |
| $CF_3$— | 3—$CF_3$— |
| Cl— | 3—$CF_3$— |

EXAMPLE 12

Groups, each comprising 4 animals, of normal (Sprague-Dawley Charles River) rats weighing from 160–220 grams are fed rat chow containing the test compounds for two overnight feeding periods. On the morning of the third day the animals are anesthetized and bled from the abdominal aorta. The total plasma cholesterol is then determined by the method of J. J. Carr and I. J. Drekter reported in Clin. Chem., 2, 353 (1956). Most of the tests are conducted at a concentration in the feed of 0.15 to 0.25 weight percent of the compound under test, but lower levels are employed in some instances. The total quantity of test compound consumed is computed from feed consumption over the two-day period and is tabulated, in milligrams per kilogram body weight per day, along with the associated percent cholesterol fall measured:

| Compound | % Cholesterol Fall | Daily Dose mg./kg. |
|---|---|---|
| 5-(2-chloro-5-[3,5-cis-dimethylpiperidinosulfonyl]phenyl)tetrazole | 15 | 68 |
| 5-(2-chloro-5-morpholinosulfonylphenyl)tetrazole | 5 | 88 |
| 5-(2-chloro-5-di-n-propyl-Sulfamoylphenyl)tetrazole | 25 | 228 |
| 5-(2-chloro-5-[2-p-chlorophenethyl]phenyl)tetrazole | 15 | 83 |
| 5-(2-chloro-5-[N-ethyl-N-2-p-chlorophenethylsulfamoyl]phenyl)tetrazole | 19 | 81 |
| 5-(2-benzylthio-5-trifluoromethylphenyl)tetrazole | 34 | 223 |

EXAMPLE 13

A dry solid pharmaceutical composition is prepared by combining the following materials in the indicated weight proportions:

| | |
|---|---|
| 5-(2-chloro-5-[3,5-cis-dimethylpiperidinosulfonyl]phenyl)tetrazole | 50 |
| calcium carbonate | 20 |
| propylene glycol, average molecular weight 4000 | 30 |

The dry mixture is thoroughly agitated to obtain a completely uniform blend. Soft elastic and hard gelatin capsules containing this composition are then prepared, employing sufficient material to provide each capsule with 190 mg. of active ingredient.

EXAMPLE 14

A dry solid pharmaceutical composition is prepared by blending the following materials together in the specified weight proportions:

| | |
|---|---|
| 5-(2-benzylthio-5-trifluoromethylphenyl)tetrazole | 50 |
| sodium citrate | 25 |
| alginic acid | 10 |
| polyvinylpyrrolidone | 10 |
| magnesium stearate | 5 |

After the dried composition is thoroughly blended, tablets are punched from the mixture, each tablet being of such size as to contain 100 mg. of the active ingredient. Tablets are also prepared containing, respectively, 5, 10, 25 and 50 mg. of the active ingredient, by employing the appropriate proportions of 5-(2-benzylthio-5-trifluoromethylphenyl)tetrazole and the excipient blend in ease case.

EXAMPLE 15

5-(2-Chloro-5-[3,5-dimethylpiperidinosulfonyl]-phenyl)tetrazole Sodium Salt

To a solution of 400 mg. (0.01 mole) of sodium hydroxide in 30 ml. of water is added, in portions and with stirring, 3.55 g. (0.01 mole) of 5-(2-chloro-5-[3,5-dimethylpiperidinosulfonyl]phenyl)tetrazole. The slightly hazy solution is filtered and the filtrate concentrated at room temperature and under reduced pressure to dryness. The residual sodium salt is triturated with acetone and filtered.

In like manner, the pharmaceutically acceptable alkali and alkaline earth metal salts of the present invention are prepared.

EXAMPLE 16

To a solution of 3.36 g. (0.01 mole) of 5-(2-benzylthio-5-trifluoromethylphenyl)tetrazole in 30 ml. of methanol is added 12 ml. of an aqueous 1N ammonium hydroxide solution. After several minutes of stirring, the solvent and excess ammonia are removed under reduced pressure and the residue triturated with diethyl ether. The ammonium salt is subsequently filtered and dried.

By employing a similar procedure, the pharmaceutically acceptable organic amine salts of the present invention are synthesized.

What is claimed is:

1. A compound selected from those of the formula

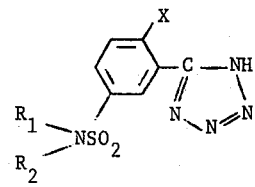

and the pharmaceutically acceptable basic salts thereof, wherein
X is selected from the group consisting of methyl, chloro, fluoro and bromo;
$R_1$ is selected from the group consisting of hydrogen and alkyl having from 1 to 4 carbon atoms;

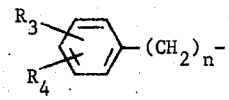

wherein $n$ is an integer of 0 to 3 and $R_3$ and $R_4$ are each selected from the group consisting of hydrogen, methyl, chloro and bromo; and
$R_1$ and $R_2$ when considered together with the nitrogen atom to which they are attached form a heterocyclic ring selected from the group consisting of morpholino, hexamethyleneimino, piperidino and mono- and dimethylpiperidino.

2. A compound of claim 1 wherein X is chloro and $R_1$ is selected from the group consisting of hydrogen and alkyl having from 1 to 4 carbon atoms.

3. The compound of claim 2 wherein $R_1$ is hydrogen and $R_2$ is $\beta$-(p-chlorophenethyl).

4. The compound of claim 2 wherein $R_1$ is ethyl and $R_2$ is $\beta$-(p-chlorophenethyl).

5. The compound of claim 2 wherein $R_1$ is n-butyl and $R_2$ is n-butyl.

6. A compound of claim 1 wherein $R_1$ and $R_2$ when considered together with the nitrogen atom to which they are attached form a dimethylpiperidino heterocyclic ring.

7. The compound of claim 6 wherein X is chloro and $R_1$ and $R_2$ when considered together form a 3,5-cis-dimethylpiperidino heterocyclic ring.

8. A compound selected from those of the formula

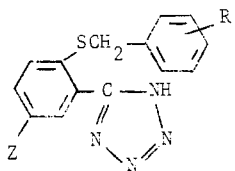

and the pharmaceutically accetable basic salts thereof, wherein

Z is selected from the group consisting of chloro and trifluoromethyl; and

R is selected from the group consisting of hydrogen, methyl, methoxy, fluoro, chloro, bromo and trifluoromethyl.

9. A compound of claim 8 wherein R is hydrogen.

10. The compound of claim 9 wherein Z is trifluoromethyl,

11. A compound of claim 8 wherein R is p-chloro.

12. The compound of claim 11 wherein Z is trifluoromethyl.

* * * * *

UNITED STATES PATENT AND TRADEMARK OFFICE
CERTIFICATE OF CORRECTION

PATENT NO. : 3,894,033
DATED : July 8, 1975
INVENTOR(S) : Gerald F. Holland

It is certified that error appears in the above-identified patent and that said Letters Patent are hereby corrected as shown below:

Col. 8, line 12, "[-dimethylpiperidinosulfonyl]" should read -- [3,3-dimethylpiperidinosulfonyl] --.

Col. 12, line 34, "and alkyl having 1 to 4 carbon atoms" should read -- and alkyl having from 1 to 4 carbon atoms, $R_2$ is selected from the group consisting of alkyl having 1 to 4 carbon atoms and --.

Signed and Sealed this thirtieth Day of September 1975

[SEAL]

Attest:

RUTH C. MASON
Attesting Officer

C. MARSHALL DANN
Commissioner of Patents and Trademarks